United States Patent Office  3,669,702
Patented June 13, 1972

3,669,702
SILICONE EMULSIONS
Ulrich Rall, Hilden, Rhineland, Herbert Frotscher, Langenfeld, Rhineland, and Manfred Petzold, Dusseldorf-Holthausen, Germany, assignors to Bohme Chemie Gesellschaft mbH, Dusseldorf-Holthausen, Germany
No Drawing. Continuation-in-part of application Ser. No. 687,134, Dec. 1, 1967. This application May 7, 1970, Ser. No. 35,586
Claims priority, application Germany, Dec. 22, 1966, B 90,419
Int. Cl. C08h 3/18
U.S. Cl. 106—287                          4 Claims

ABSTRACT OF THE DISCLOSURE

An aqueous silicone emulsion for treating fibrous materials, containing an oily polysiloxane and as an emulsifying agent a partially-reacted polymeric compound which contains hydrogen atoms attached to aminonitrogen atoms and halohydrin groups, the ratio of said hydrogen atoms to said halohydrin groups being from 1:0.6 to 1:1.5, as well as high-molecular-weight lipophilic radicals and/or polysiloxane radicals.

PRIOR APPLICATIONS

This application is a continuatin-in-part of our copending U.S. patent application Ser. No. 687,134, filed Dec. 1, 1967, now abandoned.

THE PRIOR ART

It is well known that aqueous emulsions of silicones are useful for a variety of industrial purposes; for instance, they are wirely employed for treating fibrous materials, such as textiles, paper, cardboard, leather and the like, to impart water-repellent properties to such materials or to soften them.

The emulsions heretofore used for the preparation of such aqueous silicone emulsions were various non-ionic, anionic or cationic surfactive compounds. However, it has been discovered that these surfactive emulsifiers have the disadvantage that they connot be readily removed or rendered inactive subsequent to the application of the silicone emulsion to the fibrous material. Residual deposits of emulsifying agent on the treated material have an adverse effect upon the stability of the silicone impregnation against wet treatment, such as washing, as well as upon the quality of the desired finishing effect due to re-emulsification or residual wetting properties.

OBJECTS OF THE INVENTION

It is an object of the present invention to provide novel emulsifying agents for the preparation of aqueous emulsions of silicones, especially silicone fluids, which may be readily inactivated after application of the emulsion to fibrous material and at the same time enhance the water-repellent effect produced thereby.

It is another object of the present invention to provide improved aqueous silicon emulsions adapted for impregnating fibrous materials, such as textiles, paper, cardboard, leather, and the like.

Still other objects and advantages of the present invention will become apparent as the description thereof proceeds.

DESCRIPTION OF THE INVENTION

Our copending application Ser. No. 509,198, filed Nov. 22, 1965, now abandoned discloses the employment as an emulsifying agent of a water-soluble polymeric compound which contains hydrogen atoms attached to aminonitrogen atoms and halogenhydrin groups in a ratio of 1:0.6 to 1:1.5, as well as high-molecular-weight lipophilic radicals, said polymeric compound being obtained by reacting a compound containing more than one primary and/or secondary amino group with a compound containing epihalogenhydrin groups and/or more than one halogenhydrin group in the molecule. Particularly suitable is a reaction product of (1) a polyamine derivative containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines having more than two reactive hydrogen atoms attached to nitrogen atoms in the molecule, and (2) epichlorohydrin.

Such water-soluble polymeric compounds possess very desirable properties for use as emulsifying agents in the preparation of aqueous silicone emulsions in that when they are heated, preferably in the presence of an acid-binding compound, i.e. a compound capable of tying up or neutralizing an acid, they are transformed into a higher polymeric, insoluble state and thus lose their wetting and emulsifying properties.

We have now discovered that the above objects are achieved by using as an emulsifying agent a water-soluble polymeric compound whose structure is the same as that disclosed in said copending application, except that some or all of the lipophilic radicals are replaced by polysiloxane radicals. Just as the polymeric compounds of the copending application, the polymeric compounds according to the present invention are transformed into a higher polymeric, insoluble state upon being heated, especially in the presence of an acid-binding compound, and thus lose their emulsifying properties, but by virtue of their polysiloxane radical content they simultaneously also enhance and improve the water-repellent effect produced on the treated fibrous material by the silicone.

The emulsifiers according to said copending application are prepared by reacting a compound containing more than one primary and/or secondary amino group with an epihalohydrin compound and/or with a compound containing more than one halohydrin group in the molecule at elevated temperatures especially between 50° and 120° C., and, if desired, in the presence of water, organic solvents and/or acid binding agents, at least one of the reaction components being substituted, either entirely or partly, by lipophilic hydrocarbon radicals.

The emulsifiers according to the present invention containing polysiloxane substituents are obtained in analogous manner by reacting an amino compound with an epihalohydrin compound or with a compound containing more than one halohydrin group in the molecule; however, the reaction components containing lipophilic hydrocarbon radicals used in the process of the copending application are, either entirely or partly, replaced by analogous compounds which are substituted by lipophilic polysiloxane radicals. At least 10, and preferably 50 to 100 mol percent of the compounds containing lipophilic hydrocarbon radicals are replaced by the compounds containing lipophilic polysiloxane radicals.

The other amino, epihalohydrin or halohydrin compounds participating in the reaction are the same as those described in the copending application.

Particularly suitable for the introduction of the lipophilic polysiloxane radicals during the condensation are polysiloxane derivatives containing from 4 to 15 silicon atoms such as dimethylpolysiloxane derivatives comprising from 5 to 10 or more silicon atoms and which contain additional groups capable of condensation. Such groups are preferably amino, polyamino, 1,2-halohydrin and 1,2-halohydrinether groups attached to silicon atoms through alkyl or aryl radicals. These polysiloxane derivatives may contain one or several of these groups.

The polysiloxane derivatives suitable for the introduction of lipophilic polysiloxane radicals are obtained by reacting amines, polyamines, epihalogenhydrins or dichlorohydrin with polysiloxane derivatives which contain groups capable of reacting with these compounds, such as halogen atoms attached to silicon atoms through alkyl or aryl radicals; 1,2-halohydrin or halohydrinether groups; alkyl or arylsulfonic acid or analogous sulfuric acid ester radicals; amino, aziridinyl, isocyanate or vinylsulfonyl radicals; or carbonyl or carboxylic acid halide groups.

Preferred are the polysiloxane derivatives of the formula

R—A—X wherein R is a lipophilic polysiloxane radical having from 4 to 15 silicon atoms connected to each other through oxygen atoms, each of said silicon atoms being bonded to at least one lower alkyl such as methyl, A is a divalent bridging link selected from the group consisting of lower alkylene, lower hydroxyalkylene, phenylene and lower alkylphenylene, and X is a compound capable of reacting with an amine, organic chloride or organic epoxide selected from the group of halogen, 1,2-halohydrin, lower alkoxy, —$SO_3H$, —$NH_2$—NCO, —$SO_2$—CH=$CH_2$, —COOH, —CO halogen, and —$SO_4$— lower alkyl. The preparation of such compounds is well known.

The condensation reaction for the preparation of the emulsifiers according to the present invention is carried out in the same manner as described in said copending application, the degree of the reaction being controlled by determination of the concentration of halogen ions produced by the reaction, or by measuring the increase in viscosity. In the end product 20–90%, preferably 50–80%, of the reactive amino, epihalohydrin or halohydrin groups present in the starting compounds should have reacted with one another. The reaction stops by itself when the pH falls below 7; or it is interrupted by addition of an acid agent when the desired degree of reaction has been reached. The reactants are provided in quantitative ratios such that the ratio of amino hydrogen atoms to halohydrin groups present in the total reaction mixture is from 1:0.6 to 1:1.5. The total amount of lipophilic hydrocarbon radicals and polysiloxane radicals in the end product is about 2–65%, preferably 6–30%, by weight of the total weight of the condensation product.

The water-soluble, heat-hardenable polymeric emulsifier of the invention therefore contains hydrogen atoms attached to aminonitrogen atoms, 1,2-halo-hydrin groups, high-molecular-weight lipophilic hydrocarbon radicals having from 12 to 22 carbon atoms and high-colecular weight lipophilic polysiloxane radicals having from 4 to 15 silicon atoms where the ratio of said hydrogen atoms to said halohydrin groups in the molecule of the polymeric emulsifier is from 1:0.6 to 1:1.5, the ratio of said lipophilic hydrocarbon radicals to said lipophilic polysiloxane radicals is from 90 to 10 to 0 to 100 and the total weight of said lipophilic hydrocarbon radicals and lipophilic polysiloxane radicals is from 2 to 65% of the total molecular weight of said polymeric emulsifier, said emulsifier being the reaction product of the partial reaction of (1) a compound containing more than one primary or secondary amino group selected from the group consisting of (a) a polyamine derivative containing said lipophilic hydrocarbon radicals, said polyamine having trivalent nitrogen atoms, and more than two hydrogen atmos attached to nitrogen atoms and being selected from the group consisting of lower alkylene and arylene polyamines, (b) a polysiloxane derivative containing said lipophilic polysilioxane radicals, said polysiloxane derivative having trivalent nitrogen atoms and more than two hydrogen atoms attached to nitrogen atoms, said nitrogen atoms being attached to silicon atoms through groups selected from the group consisting of lower alkylene and arylene and (c) a polyamine free of lipophilic radical shaving trivalent nitrogen atoms, more than two hydrogen atoms attached to nitrogen atoms and being selected from the group consisting of lower alkylene and arylene polyamines and (2) a halogen-containing compound containing halohydrin groups selected from the group consisting of (a) epichlorohydrin (b) a polysiloxane derivative containing said lipophilic polysiloxane radicals, said polysiloxane derivative having halohydrin groups selected from the group consisting of 1,2-halohydrin and 1,2-halohydrin ether, said halohydrin groups being atached to silicon atoms through groups selected from the group consisting of lower alkylene and arylene, and (c) a lipophilic hydrocarbon derivative containing said lipophilic hydrocarbon radicals, said lipophilic hydrocarbon derivative have attached thereto at least one 1,2-halohydrin group, at least one of said reactants (1) and (2) having said lipophilic polysiloxane and lipophilic hydrocarbon substituents attached thereto, said partial reaction being conducted at elevated temperatures until from 20 to 90% of said hydrogen atoms and said halohydrin groups have reacted. Preferably the amino group containing reactant has the formula

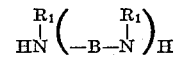

wherein $R_1$ is selected from the group consisting of R—A— as defined above, hydrogen and $R_2$—A— wherein A is defined as above and $R_2$ is an alkyl having 12 to 22 carbon atoms, B is a member selected from the group consisting of lower alkylene and arylene, preferably phenylene and n is an integer from 0 to 3. The halogen containing reactant preferably is epichlorohydrin or has the formula

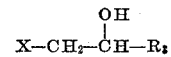

wherein X is a halogen, preferably chlorine and $R_3$ is selected from the group consisting of R—A— and $R_2$—A— wherein R, A and $R_2$ are defined above.

The preparation of the silicone emulsions utilizing the emulsifying agents of the present invention is effected in the same manner as described in said copending application, preferably by means of a high-pressure homogenization apparatus Oily polysiloxanes, having from 4 to 15 silicon atoms connected to each other through oxygen atoms, each of said silicon atoms being bonded to at least one lower alkyl, such as methylhydrogenpolysiloxane or dimethylpolysiloxane, are preferably employed as silicones.

The aqueous emulsion according to the present invention contain up to 50% by weight of a silicone preferably from 0.5% to 50% by weight of said oily polysiloxanes and 1–20% by weight based on the silicone constituent of an emulsifier of the invention. At a pH below 7 the emulsions of the invention are extraordinarily stable, and after having been diluted with water, they may be used for the treatment of fibrous materials, such as textiles, paper, cardboard, leather, as well as for the surface treatment of plastics, glass ceramics and the like, whereby excellent and durable hydrophobic effects as well as adhesion-reducing and adhesive-repellent effects are obtained. Furthermore, good softening effects are obtained on textile materials. Hardening is effected at elevated temperatures of about 100–160° C., preferably acid acceptors, such as sodium acetate, being used as hardening agents.

The following examples further illustrate the present invent and will enable others skilled in the art to understand it more completely. It should be understood, however, that the instant invention is not limited solely to the particular examples given that follow:

EXAMPLE 1

1.2 parts by weight of the emulsifier described in greater detail below were dissolved in 70 parts by weight of boiling water, the solution was adjusted to pH 4 by addition of acetic acid, the acid solution was cooled to 35° C. A mixture consisting of 8 parts by weight of isopropanol and 18 parts by weight of methylhydrogenpolysiloxane having a molecular weight of 2500 was stirred into the cool acid solution, and the raw emulsion thus obtained was homogenized by means of a high-pressure homogenization apparatus at a pressure of 150 atmospheres. The homogenized emulsion was diluted with water, yielding a very stable aqueous silicone emulsion which produced very good water-repellent effects on textile materials.

The emulsifier was prepared in the following manner: In a flask equipped with stirrer, reflux condenser and thermometer, 56.5 parts by weight of a bis-(dimethylpolysiloxane-β-hydroxypropyl)-polyamine were reacted in the presence of 40 parts by weight of isopropanol with 7 parts by weight of epichlorohydrin at a temperature of about 70° C. until the pH had dropped to 5.3. The reaction product was then stirred with 150 parts by weight of hot water to form a paste.

The polysiloxane-polyamine derivative was obtained by reacting 1-chloro-2-hydroxypropyl - dimethylpolysiloxane having an approximate molecular weight of 500 with dipropylenetriamine in a molar ratio of 2 to 1.

EXAMPLE 2

One part by weight of the emulsifier described below was dissolved in 75 parts by weight of water, and then a solution consisting of 18 parts by weight of dimethylpolysiloxane (viscosity approximately 500 centipoises) and 10 parts by weight of perchloroethylene was stirred into the aqueous emulsifier solution at a temperature of about 30° C. The raw emulsion thus obtained was homogenized twice in a high-pressure homogenization apparatus at a pressure of 100 atmospheres. The slightly acid homogenized emulsion was diluted with water in a ratio of 1:20 and 5 gm./l. of sodium acetate was added to the dilute emulsion, and a wool textile fabric was impregnated. The finished textile material was dried for five minutes at a temperature of 120° C., whereupon it exhibited a very good wash-proof softening effect.

The emulsifier was prepared as follows: In the apparatus described in Example 1, 106.2 parts by weight of the bis-chlorohydrinether of diglycol were admixed at 80° C. by stirring with 30.6 parts by weight of a linearly formed dimethylpolysiloxane derivative having a terminal primary aminopropyl group (molecular weight about 1000), 11 parts by weight of aqueous 50% sodium hydroxide and 7 parts by weight of isopropanol. The mixture was then stirred for 80 minutes more at 90° C.; thereafter, it was admixed by stirring with 21.6 parts by weight of dihexamethylenetriamine, 150 parts by weight of 50% isopropanol and 17 parts by weight of 50% sodium hydroxide, and the mixture was allowed to react at a temperature of 85° C. until 65% of the organically bonded chlorine had become ionic. Thereafter, the reaction mixture was adjusted with formic acid to a pH of 4.2.

EXAMPLE 3

0.75 part by weight of the emulsifier described below were dissolved at 32° C. in 65 parts of water which contained 7.5 parts by weight of sodium acetate per liter; then, while stirring, the aqueous solution was admixed with a mixture consisting of 9 parts by weight of methylhydrogenpolysiloxane having a molecular weight of 2000, 9 parts by weight of dimethylpolysiloxane having a viscosity of 350 centipoises and 10 parts by weight of ethanol. The raw emulsion thus obtained was homogenized at a pressure of 140 atmospheres into a stable emulsion with a pH of 5.5. This emulsion produced simultaneous water-repellent and softening effects on cotton-poplin fabrics.

The emulsifier was prepared in the following manner: 102 parts by weight of the bis-chlorohydrinether of triethyleneglycol were placed into the apparatus described in Example 1. Then, at a temperature of 70° C., 8 parts by weight of coconut amine, 5.1 parts by weight of the polysiloxane-amine derivative described in Example 2, 9.1 parts by weight of aqueous 50% sodium hydroxide and 10 parts by weight of isopropanol were added thereto while stirring, and the mixture was reacted for 60 minutes at a temperature of 88° C. Thereafter, 13.2 parts by weight of dipropylenetriamine, 100 parts by weight of aqueous 50% isopropanol and 15 parts by weight of aqueous 50% sodium hydroxide were added, and the mixture was allowed to react at 83° C. until 60% of the organically bonded chlorine had become ionic. The reaction mixture thus obtained was adjusted to a pH below 5.2 with the aid of aqueous 5% hydrochloric acid.

EXAMPLE 4

230 parts by weight of a polysiloxane-alkylcarboxylic acid-amidopolyamine derivative, obtained by reacting equimolar amounts of a slightly branched dimethylpolysiloxane having a terminal carboxyalkyl group (molecular weight about 900) and dipropylenetriamine, were reacted with 32.5 parts by weight of epichlorohydrin in the presence of 250 parts by weight of isopropanol and at a temperature of about 60° C. until the pH had dropped below 5.5. Thereafter, the reaction product was diluted with hot water to make 1000 parts by weight.

The aqueous condensation product was used as the emulsifier for the preparation of an aqueous silicone emulsion, as described in Example 1, which produced a very good and durable water-repellent finish on textile fabrics.

EXAMPLE 5

80 parts by weight of the tris-chlorohydrinether of an adduct of 6 moles of ethyleneoxide to glycerin were reacted with 100 parts by weight of a dimethylpolysiloxane derivative having a molecular weight of 1000 and containing two primary aminoethyl groups directly attached to silicon in the presence of isopropanol and aqueous 50% sodium hydroxide and at a temperature of about 85° C., until 52% of the organically bonded chlorine had become ionic. Thereafter, the reaction mixture was adjusted to a pH below 5 by addition of aqueous 10% acetic acid.

The condensation product thus obtained was used as the emulsifier for the preparation of an aqueous silicone emulsion, as described in Example 2, which produced very good and durable water-repellent and softening effects on wool fabrics.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. An aqueous silicone emulsion for treating fibrous materials, said emulsion consisting essentially of water, from 0.5% to 50% by weight of oily polysiloxane, and from 1 to 20% by weight, based on the weight of said polysiloxane, of a water-soluble heat-hardenable polymeric emulsifier, said emulsifier containing hydrogen atoms attached to aminonitrogen atoms, 1,2-halohydrin groups, high-molecular-weight lipophilic hydrocarbon radicals having from 12 to 22 carbon atoms and high-molecular weight lipophilic polysiloxane radicals having from 4 to 15 silicon atoms where the ratio of said hydrogen atoms to said halo-hydrin groups in the molecule of the polymeric emulsifier is from 1:0.6 to 1:1.5, the ratio of said lipophilic hydrocarbon radicals to said lipophilic polysiloxane radicals is from 90 to 10 to 0 to 100 and the total weight of said lipophilic hydrocarbon radicals and lipophilic polysiloxane radicals is from 2 to 65% of the total molecular weight of said polymeric emulsifier, said emulsifier being the reaction product of the partial reaction of (1) a compound containing more than one primary or secondary amino group selected from the group consisting of (a) a polyamine derivative containing said lipophilic hydrocarbon radicals, said polyamine having trivalent nitrogen atoms, and more than two hydrogen atoms attached to nitrogen atoms and being selected from the group consisting of lower alkylene and phenylene polyamines, (b) a polysiloxane derivative containing said lipophilic polysiloxane radicals, said polysiloxane derivative having trivalent nitrogen atoms and more than two hydrogen atoms attached to nitrogen atoms, said nitrogen atoms being attached to silicon atoms through groups selected from the group consisting of lower alkylene, lower hydroxyalkylene, phenylene and lower alkylphenylene and (c) a polyamine free of lipophilic radicals having trivalent nitrogen atoms, more than two hydrogen atoms attached to nitrogen atoms and being selected from the group consisting of lower alkylene and phenylene polyamines and (2) a halogen-containing compound containing halohydrin groups selected from the group consisting of (a) epichlorohydrin (b) a polysiloxane derivative containing said lipophilic polysiloxane radicals, said polysiloxane derivative having halohydrin groups selected from the group consisting of 1,2-halohydrin and 1,2-halohydrin ether, said halohydrin groups being attached to silicon atoms through groups selected from the group consisting of lower alkylene, lower hydroxyalkylene, phenylene and lower alkylphenylene, and (c) a lipophilic hydrocarbon derivative containing said lipophilic hydrocarbon radicals, said lipophilic hydrocarbon derivative having attached thereto at least one 1,2-halohydrin group, at least one of said reactants (1) and (2) having said lipophilic polysiloxane and lipophilic hydrocarbon substituents attached thereo, said partial reaction being conducted at temperatures of between 50° C. and 120° C. until from 20 to 90% of said hydrogen atoms and said halohydrin groups have reacted, the pH of said emulsion being below 7.

2. An aqueous emulsion as in claim 1, wherein said ratio of said lipophilic radicals to said lipophilic polysiloxane radicals is from 50 to 50 to 0 to 100.

3. The aqueous silicon emulsion of claim 1 wherein said compound (1) containing more than one primary or secondary amino group has the formula

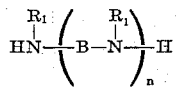

wherein $R_1$ is a member selected from the group consisting of hydrogen, R—A— and $R_2$—A—, R is a lipophilic polysiloxane having from 4 to 15 silicon atoms connected to each other through oxygen atoms, each of said silicon atoms being bonded to at least one lower alkyl such as methyl, A is a divalent bridging link selected from the group consisting of lower alkylene, lower hydroxyalkylene, phenylene and lower alkylphenylene, $R_2$ is an alkyl having 12 to 22 carbon atoms, B is a member selected from the group consisting of lower alkylene and phenylene and $n$ is an integer from 0 to 3; and said halogen-containing compound (2) containing halohydrin groups is selected from the group consisting of epichlorohydrin and a compound of the formula

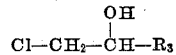

wherein $R_3$ is a member selected from the group consisting of R—A— and $R_2$—A— where R, $R_2$ and A have the above-defined meanings.

4. A method for rendering fibrous materials hydrophobic which consists essentially of applying an aqueous silicone emulsion for treating fibrous materials, said emulsion consisting essentially of water, from 0.5% to 50% by weight of oily polysiloxane, and from 1 to 20% by weight, based on the weight of said polysiloxane, of a water-soluble heat-hardenable polymeric emulsifier, said emulsifier containing hydrogen atoms attached to amino-nitrogen atoms, 1,2-halo-hydrin groups, high-molecular-weight lipophilic hydrocarbon radicals having from 12 to 22 carbon atoms and high-molecular weight lipophilic polysiloxane radicals having from 4 to 15 silicon atoms where the ratio of said hydrogen atoms to said halohydrin groups in the molecule of the polymeric emulsifier is from 1:0.6 to 1:1.5, the ratio of said lipophilic hydrocarbon radicals to said lipophilic polysiloxane radicals is from 90 to 10 to 0 to 100 and the total weight of said lipophilic hydrocarbon radicals and lipophilic polysiloxane radicals is from 2 to 65% of the total molecular weight of said polymeric emulsifier, said emulsifier being the reaction product of the partial reaction of (1) a compound containing more than one primary or secondary amino group selected from the group consisting of (a) a polyamine derivative containing said lipophilic hydrocarbon radicals, said polyamine having trivalent nitrogen atoms, and more than two hydrogen atoms attached to nitrogen atoms and being selected from the group consisting of lower alkylene and phenylene polyamines, (b) a polysiloxane derivative containing said lipophilic polysiloxane radicals, said polysiloxane derivative having trivalent nitrogen atoms and more than two hydrogen atoms attached to nitrogen atoms, said nitrogen atoms being attached to silicon atoms through groups selected from the group consisting of lower alkylene, lower hydroxyalkylene, phenylene and lower alkylphenylene and (c) a polyamine free of lipophilic radicals having trivalent nitrogen atoms, more than two hydrogen atoms attached to nitrogen atoms and being selected from the group consisting of lower alkylene and phenylene polyamines and (2) a halogen-containing compound containing halohydrin groups selected from the group consisting of (a) epichlorohydrin (b) a polysiloxane derivative containing said lipophilic polysiloxane radicals, said polysiloxane derivative having halohydrin groups selected from the group consisting of 1,2-halohydrin and 1,2-halohydrin ether, said halohydrin groups being attached to silicon atoms through groups selected from the group consisting of lower alkylene, lower hydroxyalkylene, phenylene and lower alkylphenylene, and (c) a lipophilic hydrocarbon derivative containing said lipohilic hydrocarbon radicals, said lipophilic hydrocarbon derivative having attached thereto at least one 1,2-halohydrin group, at least one of said reactants (1) and (2) having said lipophilic polysiloxane and lipophilic hydrocarbon substituents attached thereto, said partial reaction being conducted at temperatures of between 50° C. and 120° C. until from 20 to 90% of said hydrogen atoms and said halohydrin groups have reacted, the pH of said emulsion being below 7, in the presence of an acid acceptor to a fibrous material, heating said fibrous material to temperatures between 100° C. and 160° C. and recovering said fibrous material rendered hydrophobic.

References Cited

UNITED STATES PATENTS

| | | | |
|---|---|---|---|
| 3,510,452 | 5/1970 | Frotscher et al. | 117—139.5 X |
| 2,836,517 | 5/1958 | Gruber et al. | 117—138.8 |
| 3,402,191 | 9/1968 | Morehouse | 252—357 X |

OTHER REFERENCES

Chem. Abstract, vol. 65: 18747g, 1966.

THEODORE MORRIS, Primary Examiner

U.S. Cl. X.R.

117—121, 139.5; 260—29.2 N, 46.5